United States Patent [19]

Chen

[11] Patent Number: 5,669,292

[45] Date of Patent: Sep. 23, 1997

[54] JUICER

[76] Inventor: Tse-Hsiung Chen, P.O. Box 82-144, Taipei, Taiwan

[21] Appl. No.: 772,916

[22] Filed: Dec. 24, 1996

[51] Int. Cl.$^6$ .............................. A23N 1/02; A47J 19/02
[52] U.S. Cl. ........................... 99/512; 99/511; 99/513
[58] Field of Search ........................... 99/495, 509–513, 99/484, 536, 537; 210/360.1, 380.1, 369; 241/37.5, 92, 282.1, 282.2; 366/314, 601; 494/36, 37, 43, 47, 10, 85

[56] References Cited

U.S. PATENT DOCUMENTS

| | | | |
|---|---|---|---|
| 2,311,379 | 2/1943 | Gillanders | 99/512 |
| 2,845,971 | 8/1958 | Cordero | 99/512 |
| 3,892,365 | 7/1975 | Verdum | 241/282.1 X |
| 4,183,293 | 1/1980 | Arao et al. | 99/513 X |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,840,119 | 6/1989 | Caldi | 99/512 |
| 5,222,430 | 6/1993 | Wang | 99/512 |
| 5,421,248 | 6/1995 | Hsu | 99/512 |
| 5,433,144 | 7/1995 | Lee | 99/512 |

Primary Examiner—Timothy F. Simone
Attorney, Agent, or Firm—Alfred Lei

[57] ABSTRACT

A juicer including a main body formed with a cylindrical recess having an open top, a dreg outlet extending the main body and being communication with the cylindrical recess, an electric motor arranged within the main body and and provided with an output axle extending upwardly out of the main body, a cylindrical filer disposed within the main body and driven by the output axle of the motor, a lid adapted to engage with the top of the main body, and a dreg displacing tool arranged in the lid, the characterized in that the lid is formed with a first tubular portion, a second tubular portion, an annular cavity between the first and second tubular portions, the second tubular portion having an upper end formed with two opposite protuberances at an inner side of said upper end, a cap mounted on the first tubular portion, a spring fitted within the annular cavity with an upper end of the spring bearing against the cap, the dreg displacing tool including an axle, a scraper extending from the axle and located an angular position with respect to the the axle and a baffle extending upwardly from the scraper, the axle being inserted into the second tubular portion and having a spiral groove receiving the two protuberances of the second tubular portion and an upper end fixedly connected with the cap.

3 Claims, 5 Drawing Sheets

JUICER

BACKGROUND OF THE INVENTION

1. Field of the Invention

This invention is related to a juicer and in particular to one with an improved dreg displacing mechanism.

2. Description of the Prior Art

As shown in FIG. 6, the dreg displacing device for a conventional juicer includes a lid A1 formed with a slot A2, a handle A3 fitted in the slot A2, and a scraper A4 fixedly mounted on a lower end of the handle A3. The handle A3 is formed at the lower portion with a track A31 engaged with the edge A21 of the lid A1 so that the handle A4 together the scraper A4 can be moved forward and backward along the slot A2. When required to displace dregs, the handle A3 is pushed to move the scraper A4 to go toward the inner wall of the filter thereby displacing the dregs. However, such a dreg displacing device suffers from the following drawbacks:

1. It is very difficult to replace the scraper A4 so that once the scraper A4 is broken, the dreg displacing function will not work any more.
2. Some of the dreg will go into the space A41 of the filter during the dreg displacement, thus making it impossible remove all dregs out of the filter.
3. The scraper A4 will be easily broken in use.
4. The scraper A4 will not automatically return to its original position, causing much inconvenience in use.
5. The scraper A4 cannot be moved up and down and so the dreg at the upper and lower portions of the filter will not be displaced by the scraper A4.

Therefore, it is an object of the present invention to provide a juicer with an improved dreg displacing mechanism which can obviate and mitigate the above-mentioned drawbacks.

SUMMARY OF THE INVENTION

This invention is related to a juicer with an improved dreg displacing mechanism.

It is the primary object of the present invention to provide a juicer with an improved dreg displacing mechanism which can be easily replaced when broken.

It is another object of the present invention to provide a juicer with an improved dreg deplacing mechanism which can displace all dregs out of the filter.

It is still another object of the present invention to provide a juicer with an improved dreg deplacing mechanism which will automatically return to its original position when released.

It is still another object of the present invention to provide a juicer with an improved dreg deplacing mechanism which can be adjusted in position.

It is a further object of the present invention to provide a juicer with an improved dreg deplacing mechanism which is simple in construction.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWING

The invention is further described hereafter, by way of example only, with reference to the accompanying drawings, in which.

DETAILED DESCRIPTION OF THE PREFERRED EMBODIMENT

Figure 1:
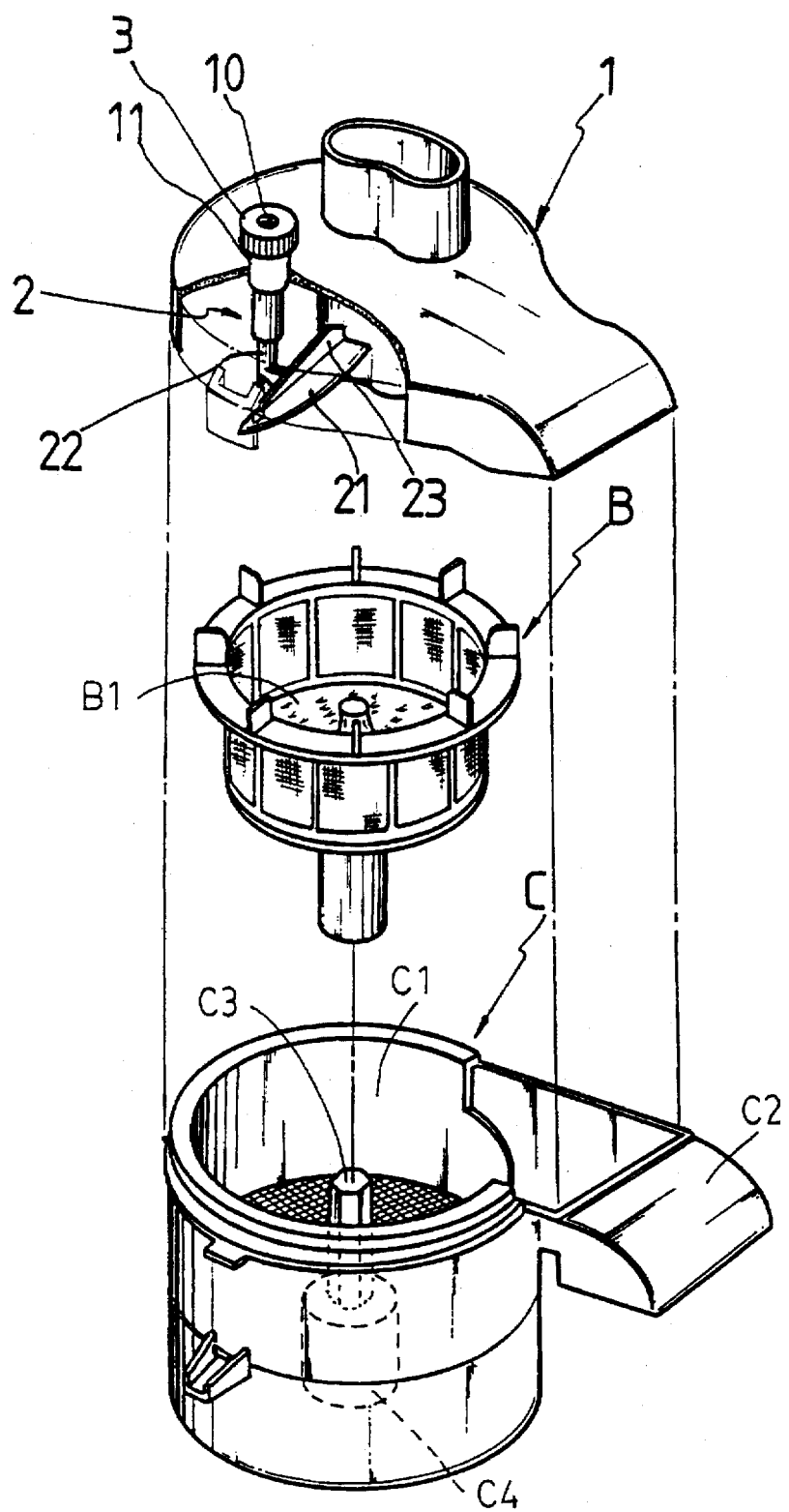
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the juicer according to the present invention basically comprises a lid 1, a dreg displacing tool 2, a cylindrical strainer B and a main body C. The main body C is formed with a cylindrical recess C1 and a dreg outlet C2 extending from the main body C for discharging dregs. An electric motor C4 is mounted within the main body C and has an output axle C3 extending upwardly out of the cylindrical recess C1. The cylindrical filter B is mounted within the main body C and driven by the output axle C3 of the electric motor. A cutter B1 is fixedly mounted on the inner bottom of the strainer B. The main body C and the strainer B may be of any conventional design well known to the art and are not considered a part of the present invention.

Figure 2:
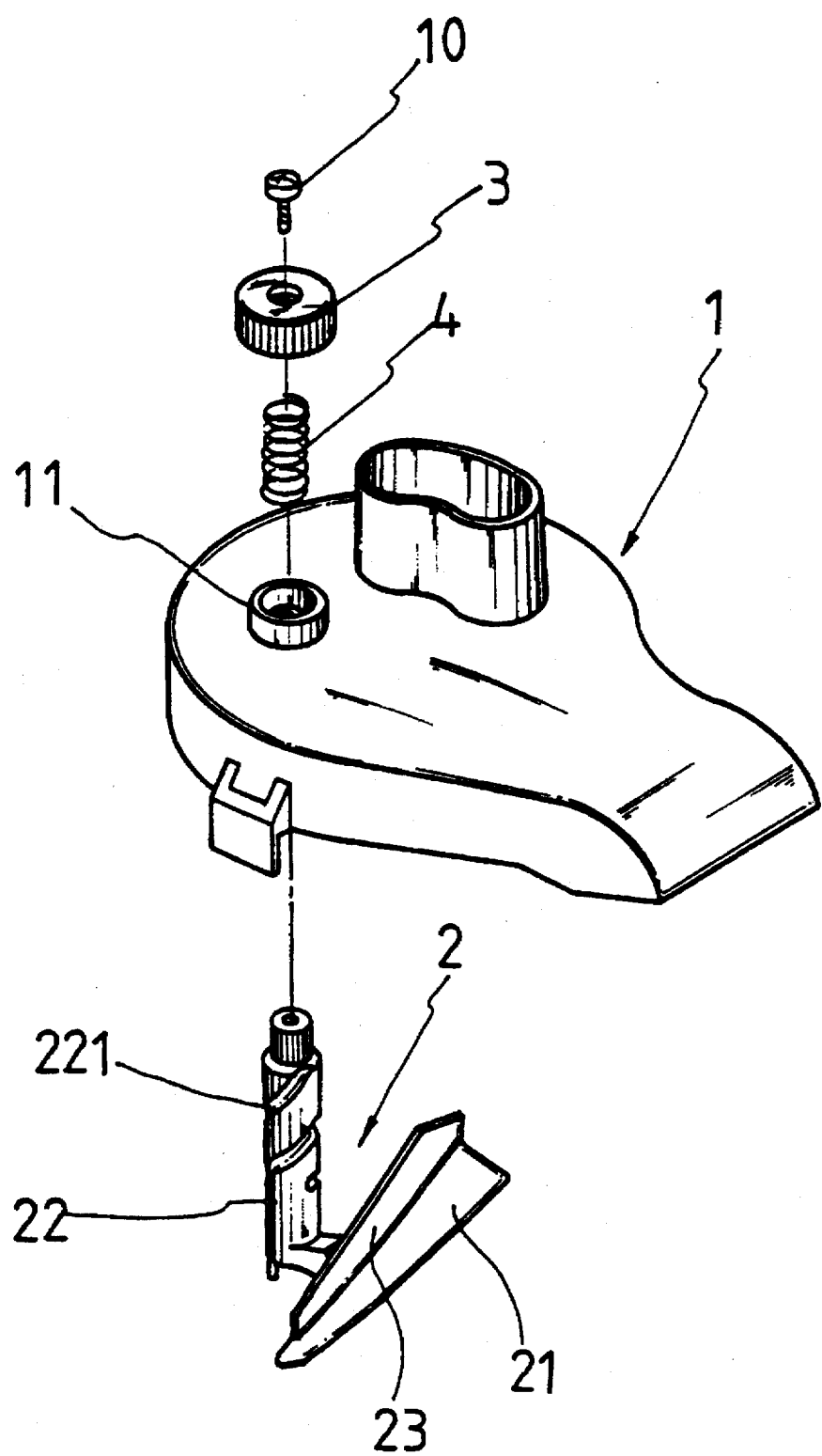
FIG. 2 is an exploded view of the upper portion of the present invention.
Figures 3A, 3B:
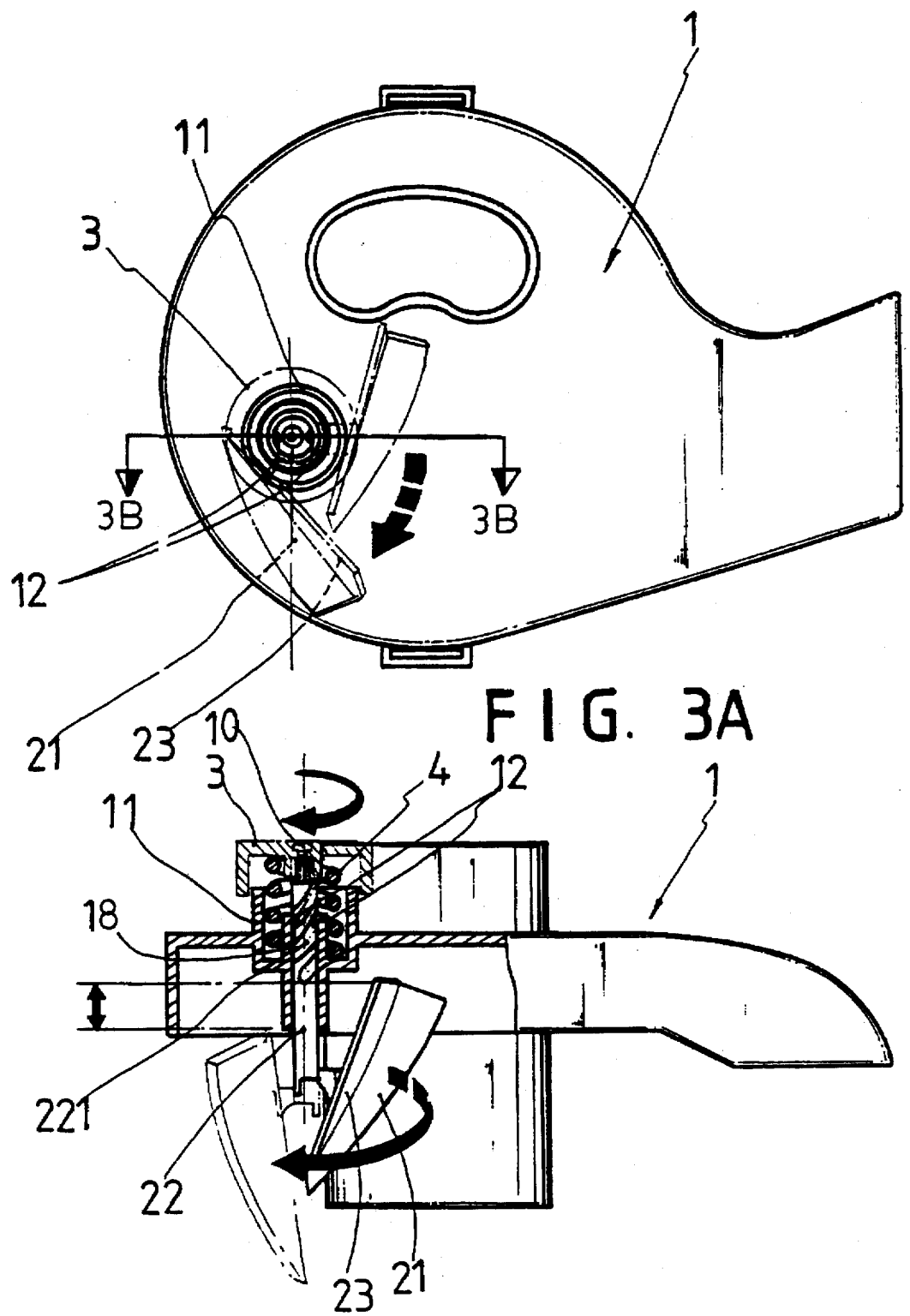
FIGS. 3A, 3B and 4 illustrate the working principle of the present invention.
Figure 4:
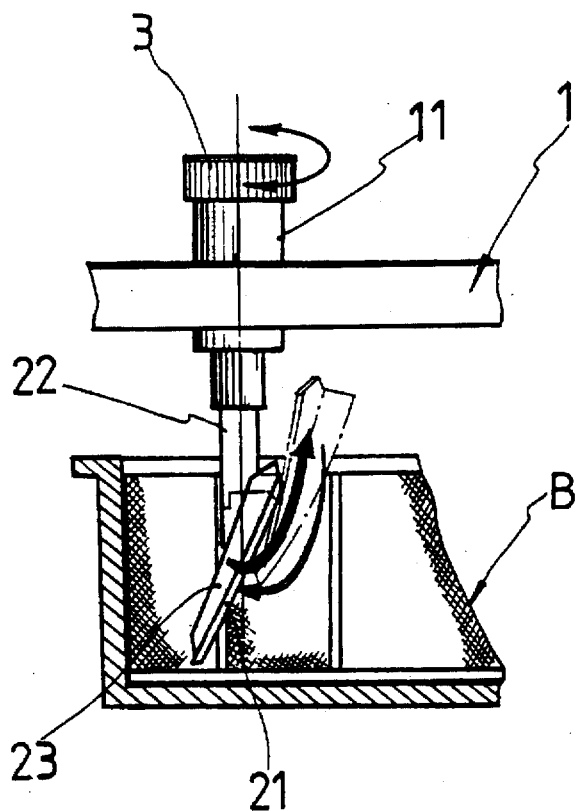

Referring to FIGS. 2, 3A and 3B, the dreg displacing mechanism 2 is arranged on the lid 1. The lid 1 is formed a with a first tubular portion 11 and a second tubular portion 18 which is concentric with the first tubular portion 11 thereby forming an annular cavity between the first and second tubular portions 11 and 18. The second tubular portion has two opposite protuberances 12 at the inner side of its upper end. A spring 4 is fitted within the annular cavity. The dreg displacing tool 2 includes an axle 22, a scraper 21 extending from the axle 22 and located at an angular position with respect to the axle 22, and a baffle 23 extending upwardly from the scraper 21. The axle 22 of a dreg displacing tool 2 is inserted into the second tubular portion 18, with its upper end fitted into a center hole of a cap 3 and fixedly secured thereto by a screw 10, so that the dreg displacing tool 2 will be rotated in unison with the cap 3. The cap 3 is fitted over the first tubular portion 11. The axle 22 is formed with a spiral groove 221 adapted to receive the two protuberances 12 of the second tubular portion 11 so that when the cap 3 is rotated, the axle 22 will be rotated downwardly or upwardly, depending on the rotating direction of the cap 3.

When in use, the cap 3 is rotated to move the dreg displacing tool downwardly and outwardly into the strainer B thereby displacing all dregs in the strainer B out of the dreg outlet C2. The baffle 23 of the dreg displacing tool 2 is designed to make sure that the dreg is guided to move along the determined path. When not in use, the cap 3 is released and the dreg displacing tool 2 is automatically returned to its original position by the spring 4.

Figure 5:
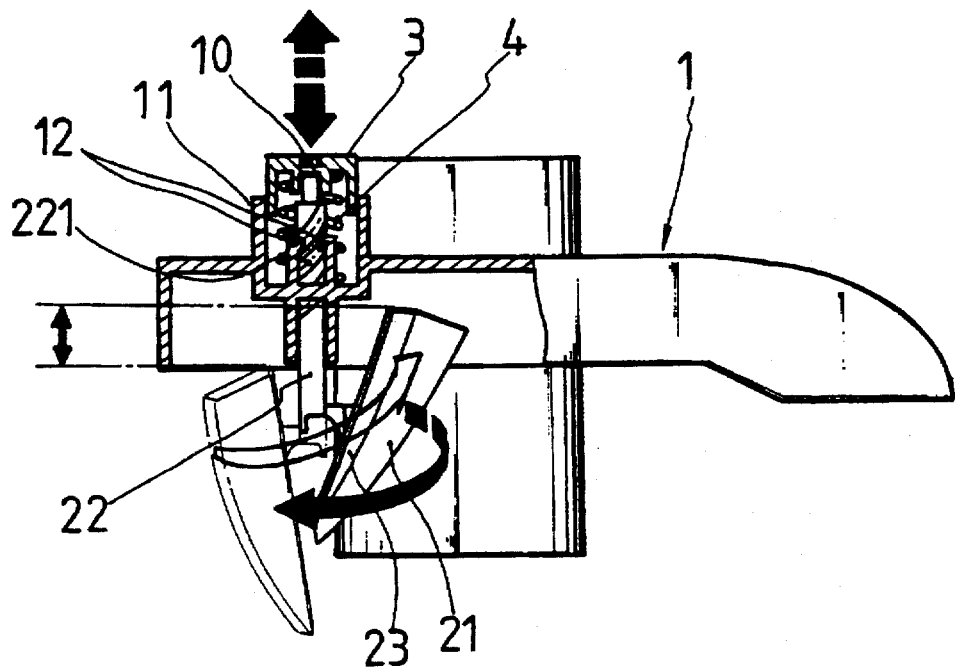
FIG. 5 illustrates a second preferred embodiment of the present invention.
Figure 6:
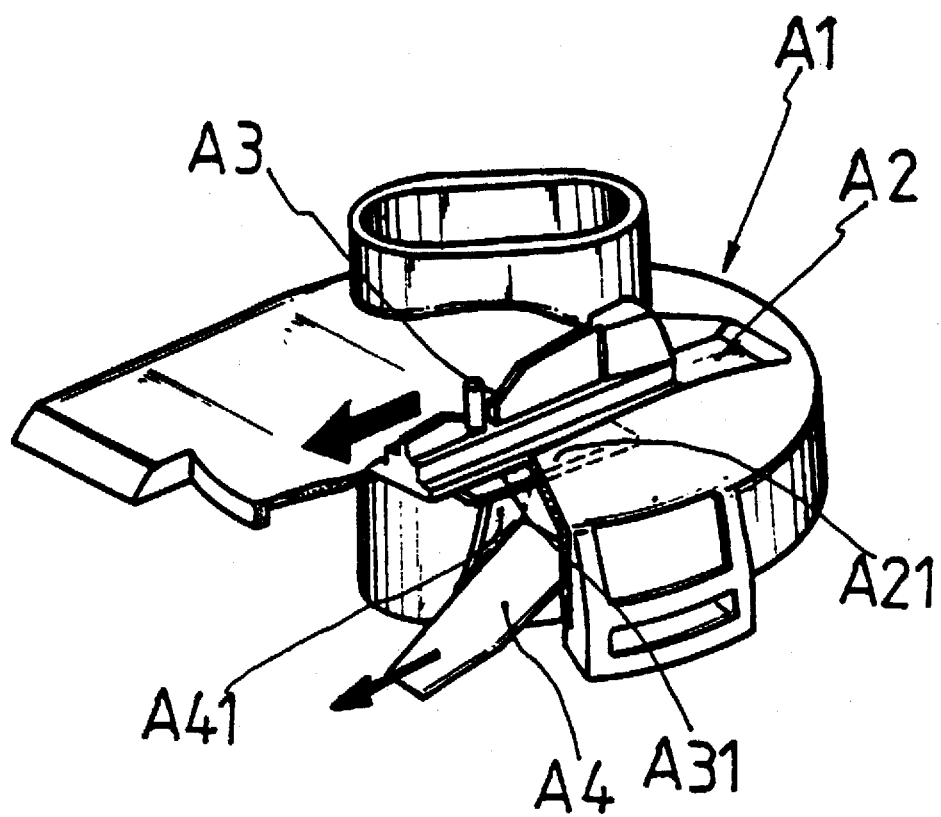
FIG. 6 is a perspective view of the dreg removing device of a prior art juicer.

FIG. 5 is a sectional view of a second preferred embodiment of the present invention. As shown, the cap 3 is fitted in the first tubular portion 11 and fixedly connected with an upper end of the axle 22 so that when the cap 3 is depressed, the dreg displacing tool 2 will be rotated downwardly to remove the dreg.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. In a juicer comprising a main body formed with a cylindrical recess having an open top, a dreg outlet extending said main body and being communication with said cylindrical recess, an electric motor arranged within said main body and and provided with an output axle extending upwardly out of said main body, a cylindrical strainer disposed within said main body and driven by said output axle of said motor, a lid adapted to engage with said top of said main body, and a dreg displacing tool arranged in said lid, the improvement wherein said lid is formed with a first tubular portion, a second tubular portion, an annular cavity between said first and second tubular portions, said second tubular portion having an upper end formed with two opposite protuberances at an inner side of said upper end, a cap mounted on said first tubular portion, a spring fitted within said annular cavity with an upper end of said spring bearing against said cap, said dreg displacing tool comprising an axle, a scraper extending from said axle and located an angular position with respect to said axle and a baffle extending upwardly from said scraper, said axle being inserted into said second tubular portion and having a spiral groove receiving said two protuberances of said second tubular portion and an upper end fixedly connected with said cap.

2. The cap of the juicer as claimed in claim 1, wherein said cap is fitted over said first tubular portion of said lid.

3. The cap of the juicer as claimed in claim 1, wherein said cap is fitted in said first tubular portion of said lid.

* * * * *